United States Patent Office 3,050,540
Patented Aug. 21, 1962

3,050,540
MANUFACTURE OF ALKYL ALUMINUM COMPOUNDS
Merle L. Gould, Baton Rouge, La., assignor to Ethyl Corporation, New York, N.Y., a corporation of Delaware
No Drawing. Filed July 30, 1958, Ser. No. 751,843
7 Claims. (Cl. 260—448)

This invention relates to the manufacture of aluminum alkyls. More particularly, the invention relates to an accelerated or catalyzed process employing elemental aluminum as a feed material.

Triethyl aluminum, in recent times, has become of considerable commercial interest for various purposes. For example, it is employed as a catalyst component in the polymerization of olefins, as a reactant in the generation of long chain alkene hydrocarbons, and as an ethylating material in the synthesis of tetraethyllead. Triethyl aluminum can be manufactured directly from elemental aluminum by a process including treating metallic aluminum with hydrogen in the presence of a liquid reaction medium comprising triethyl aluminum. Such a process involves either single stage or successive two stage operations. In the latter case the hydrogenation treatment is followed by the addition of ethylene gas to the system. The initial hydrogenation operation results in inter-reaction of triethyl aluminum, aluminum, and hydrogen to form a liquid reaction system including diethyl aluminum hydride $(C_2H_5)_2AlH$. This component is converted to triethyl aluminum by ethylation. Alternatively, if desired, the process can be carried out in a single stage with joint feeding of both hydrogen and ethylene to the liquid-solid system to form triethyl aluminum directly.

While the direct formation of triethyl aluminum as described above is perfectly operable, it is found susceptible to several limiting factors which tend to limit commercial utilization thereof. These limitations are recognizable as discrete factors or obstacles to effective operation. Firstly, the aluminum charged, in order to effectively react as already described, must be active or sensitized for the said reaction. This means, simply, that nascent or unobscured aluminum metal surfaces must be available for the reaction to occur. Hence, frequently when commercial sources of aluminum are provided as the sole feed to a batch operation, reaction does not occur for a relatively lengthy period. This difficulty is, it is believed, attributed to the existence of a thin film of aluminum oxide on the surface of commercially available particles. It is known that such oxide films form practically instantaneously upon exposure of aluminum metal to atmospheric oxygen. However, despite the existence of such a bar to initial reaction, it is further found that the lack of activity of such aluminum can be circumvented by several techniques. A very effective example of such techniques is to provide a hold-up of aluminum, and desirably a substantial excess at all times, so that the residence time of the aluminum as freshly fed in a reaction system is more extended than is required for the liquid phase present. In other words, in a cyclic operation, a heel of unreacted aluminum is retained at all times from one to successive cycles. It is found that the aluminum so retained is fully activated, that is, it is susceptible to reaction practically immediately upon application of hydrogen pressure in the reaction environment. A second and equally significant obstacle to commercial acceptance of the direct process above described, is the relative slowness of reaction once it is initiated. In other words, even though the aluminum present is activated, and reacts with hydrogen and triethyl aluminum present, the rate of reaction is frequently found to be so modest that commercial effectiveness (as exhibited by production rate for a given volume of reaction space) is significantly limited. The present invention is directed to this latter deficiency of the prior art.

The general object of the present invention, then, is to provide a new and improved process for the production of trialkyl aluminum compounds wherein the rate of reaction is significantly improved. A more specific object is to provide a process for making triethyl aluminum, wherein the formation of aluminum-hydrogen bonds is significantly accelerated. Yet another object of certain specific embodiments of the invention is to provide a technique of accelerating the formation of aluminum hydrogen bonds, or, alternatively expressed, the rate of take-up of hydrogen to a reacting system, characterized by the formation of a catalytic additive by recirculation and reaction of a portion of the reaction system. Other objects will appear hereinafter.

The present invention comprises, generally, in the formation of a triethyl aluminum product by treating a reaction system comprising triethyl aluminum and aluminum with hydrogen at pressurized conditions and at somewhat elevated temperature, the improvement of providing a hydrogenation accelerator to said system, said accelerator or catalyst comprising an organo metal compound of an active metal, the active metal being an alkali metal, or an alkaline earth metal. In preferred forms of the invention, the accelerator is provided to the reaction zone as a complex with the ethylaluminum compound formed or normally present in the reaction. A particularly effective and convenient mode of carrying out the invention involves with withdrawal of some of the reaction solution and the treatment thereof with an active metal component to generate complexes comprising organo compounds of the active metal and aluminum. As discussed more fully below, the active metal compound may also be an aryl compound of the active metal, e.g., phenyl sodium, or an alkyl derivative other than an ethyl compound of the metal.

The hydrogenation accelerators are employed in quite modest or catalytic quantities, of the order of, usually at least about 0.1 mole percent, based upon the trialkyl aluminum present as a liquid component of the reaction system, but frequently up to 10 to 25 mole percent concentration. A particularly preferred embodiment of the process employs tetraethylsodium aluminum $$(C_2H_5)_4NaAl$$

as the hydrogenation accelerator, and other complex alkyls of this type are effective and quite valuable.

The details of the process and the best mode of implementing the several embodiments thereof will be fully understood from the following description and working examples.

Prior to examples of the present process, it is necessary to illustrate the operation according to the known method, for example such as is disclosed in the Redman patent U.S. 2,787,626. The following description of a typical operation shows the performance of such a process. A reaction system was established comprising 100 parts of liquid triethyl aluminum and about 23 parts by weight of commercial aluminum powder, thus providing approximately one mole of triethylaluminum charged to one atom weight of aluminum. The aluminum powder employed was finely subdivided commercial material, which exhibited the following size properties: 99.5 percent less than 74 microns in size, and 88.5 percent less than 44 microns in size. The above components were charged to a reaction vessel or autoclave which was tightly sealed and then hydrogen pressure was applied thereto, at an operating level of approximately 1,000 pounds per square inch, while maintaining the reaction vessel contents at a temperature of about 140° C. No reaction occurred during a one hour induction period. After that time, hydrogen take-up occurred at the rate of 0.005 mole per mole of triethyl aluminum per minute. This rate was not absolutely constant during the entire reaction period, but was relatively constant during the maximum period of hydrogen take-up. Take-up was continued until hydrogen absorption and reaction corresponded to between 60 and about 80 percent conversion of the triethyl aluminum present to diethyl aluminum hydride. Because of a decreasing rate of take-up during the latter portion of the reaction, the reaction was necessarily continued for a total of three hours, or two hours past the termination of the "induction" period to provide the desired operation.

It is seen from the foregoing description of operation that commercial aluminum, which has not been particularly carefully protected against formation of the surface film of oxide in/or other contaminants, is quite effective for forming diethyl aluminum hydride by the direct reaction with aluminum and triethyl aluminum. Portions of the so treated reaction mixture readily reacted with ethylene to convert the aluminum-hydrogen bonds within the system to aluminum ethyl bonds, thus generating additional triethyl aluminum.

When the operation above described was repeated, except that instead of fresh commercial aluminum powder, the aluminum charged was excess and unreacted aluminum residue left over from a preceding operation, the induction period was greatly reduced or substantially eliminated. Upon bringing to reaction conditions of 140° C. and applying hydrogen pressure as before, hydrogen take-up occurred immediately and the take-up rate was again at the same level as encountered in the preceding operation. Thus only about two hours was necessary to achieve substantially the same degree of conversion of triethyl aluminum to an ethyl aluminum hydride as required three hours by the technique described firstly above.

Although, as demonstrated above, it is not essential to employ catalysts for the formation of ethyl aluminum hydride in the course of manufacturing additional triethyl aluminum, it is quite evident from the runs described above that the rate of hydrogen absorption leaves much to be desired. The examples hereafter of the present improvement illustrate how this deficiency can be remedied.

*Example I*

Approximately 100 grams of previously prepared triethylaluminum was charged to a reaction zone, followed by the addition of approximately 24 parts of finely subdivided aluminum metal which had been previously activated by contacting with triethyl aluminum under hydrogen pressure. This previous activation treatment was followed by draining of the liquid alkyl aluminum material and washing of the aluminum with an inert hydrocarbon solvent, leaving the aluminum in a dry active state. In addition to the triethyl aluminum and aluminum charged, about 22 parts of tetraethyl sodium aluminum, $(C_2H_5)_4NaAl$ was added, this material being in the form of dry powder. This additive, then, was in the proportions of 0.15 mole per mole of triethyl aluminum initially present. The reaction vessel was sealed and the contents heated to 140° C. and concurrently approximately 1,000 pounds pressure of hydrogen was applied. The contents were vigorously agitated and the course of reaction was observed by the hydrogen pressure, no additional hydrogen being added. The hydrogenation reaction proceeded smoothly with a good conversion to diethyl aluminum hydride by reaction of the aluminum, triethyl aluminum and hydrogen fed. During the major portion of the reaction, the hydrogen was taken up at the rate of 0.0105 gram mole of hydrogen per minute per mole of triethyl aluminum present. It is seen that this rate of reaction corresponds to over 200 percent of the standard reaction rate in the absence of the accelerating catalyst of the present process. The liquid phase of the reaction product mixture is readily separable from the excess aluminum present and can be withdrawn and filtered for subsequent treatment with ethylene to form triethyl aluminum for sale or use.

In the foregoing example the aluminum was employed in roughly 100 percent excess of the stoichiometric requirements for the expected and observed reaction:

$$2(C_2H_5)_3Al + Al + 3/2 H_2 \rightarrow 3(C_2H_5)_2AlH$$

Frequently a further excess of aluminum is also desirable as shown in the following operation.

*Example II*

In this operation the same precedure as above described was employed, except that the aluminum content is increased to about 100 grams per 100 grams of triethyl aluminum charged, this corresponding to about 8 theories of the stoichiometric requirement. In carrying out the hydrogenation operation, again with the same addition of tetraethyl sodium aluminum as an accelerator, the rate of hydrogen uptake is substantially increased.

Generally, the absolute rate of hydrogen take-up is further benefited up to proportions of up to as high as 15 times the theoretical requirements of aluminum for the reaction. However, in practice proportions of from about 8 to 11 are preferred, inasmuch as further increasing the proportions of solid aluminum particles present tends to complicate the agitation and handling problems.

As heretofore described, the organo compounds of the alkali metals and of the alkaline earth metals which are employed as hydrogenation accelerators in the present process can be generated by a separate treatment of the reaction solution, comprising principally triethyl aluminum, with minor quantities of the metals involved. This technique is particularly effective in commercial operations, inasmuch as it facilitates the addition of catalyst components to the reaction system. A typical embodiment of this mode of operation is shown by the following example.

*Example III*

A reaction charge as prepared in Example II above was again provided. However, instead of feeding tetraethyl sodium aluminum as an accelerator directly to the reaction zone, a portion of the triethyl aluminum initially charged is withdrawn to a side vessel or catalyst former. In this chamber, approximately 0.23 part by weight of sodium are introduced and the mixture is heated, resulting in the formation of sodium aluminum tetraethyl according to the following equation:

$$3Na + 4(C_2H_5)_3Al \rightarrow 3(C_2H_5)_4NaAl + Al$$

The above described operation is carried out by heating the system to about 120° C. with agitation. As a result of the reaction a corresponding amount of tetraethyl sodium aluminum is produced, and recirculation of the product of the side or catalyst forming reaction is a convenient manner of introducing the catalyst to the reaction system. Application of hydrogen pressure to the main reaction zone results in substantially accelerated rate of hydrogen take-up.

Although tetraethyl sodium aluminum is readily available and probably the most economical accelerator available for the present process, the other organo compounds of the alkali and alkaline earth metals are also readily effective and utilizable. An illustrative example of this is given in the following example.

*Example IV*

A reaction system is again prepared including about 100 parts by weight of triethyl aluminum and roughly 100 parts by weight of previously activated finely divided aluminum powder, this corresponding generally to about 8 times the stoichiometric requirements. About 4 parts of diethyl magnesium $(C_2H_5)_2Mg$ are added, and upon application of hydrogen pressure at an operating temperature of 140° C., a hydrogen take-up rate substantially higher than the base rate is again achieved.

In addition to the organo compounds of the alkali and alkaline earth metals already illustrated above, when other materials, such as propyl sodium, $(C_3H_7)Na$, ethyl lithium, propyl lithium, butyl sodium, diethyl calcium, and others are substituted for tetraethyl sodium aluminum additive in the foregoing example, or for the diethyl magnesium in Example IV above, similar improvements in hydrogen reaction rate are experienced.

In addition to the simple alkyl compounds of the alkali and alkaline earth metals above enumerated, the complex materials, similar in structure to the tetraethyl sodium aluminum employed in Example I, are eminently suitable for the acceleration desired of the hydrogenation reaction. Thus, when tetraethyl lithium aluminum, $(C_2H_5)_4LiAl$; tetraethyl potassium aluminum, $$(C_2H_5)_4KAl$$

triethyl sodium zinc, $(C_2H_5)_3NaZn$ are employed as accelerators in comparable proportions, similar benefits on the hydrogenation rate are achieved.

Other examples of the mode of operation wherein the catalyst or accelerator component is generated externally from the reaction zone, as in Example III, involve the use, for example of lithium, cesium, potassium, calcium or magnesium metal to react with the triethyl aluminum component of the reaction system in a separate zone, to form the corresponding complex alkyl metal compound for catalysis.

The complex metal alkyls and simple alkyls employed as catalysts are normally insoluble in the reaction system and exists as a separate phase. The function of these accelerators is not clearly understood, but it is believed that they facilitate or expedite the desired overall reaction by the formation of a relatively stable complex with hydrided aluminum compound as rapidly as it is formed. Such a stabilized aluminum hydride intermediate could, nevertheless, be susceptible to inter-reaction with the triethyl aluminum present to form the diethyl aluminum hydride which reacts with ethylene to form additional triethyl aluminum.

As clear from the foregoing examples, the catalysts employed can be either generated in an external side reaction zone, or can be added to the principal reaction zone as such. Generally, it is preferred to conduct the entire operation in batch or cyclic manner, in which case the desired proportions of catalyst can be inserted at the start of operations. In other instances, however, continuous type processing is quite feasible. In such cases, provision is necessarily made for replenishing the aluminum metal required and for occasional addition of minor additional amounts of catalyst. As already mentioned, in most embodiments of the process, the catalyst is present as a separate phase, and will be discharged concurrently from the system with the liquid ethyl aluminum product. However, it is also feasible to settle out the aluminum and the catalyst phase, in which case the useful life of a specific catalyst charge can be prolonged through a plurality of cycles.

As already noted, very small proportions of the catalyst, in terms of molal concentrations, are highly effective. In most instances the catalyst concentration is generally in the range of about 0.1 mole percent, based upon the triethyl aluminum processed, up to several percent, although higher concentrations are not deleterious.

The conditions of operation are not necessarily altered to employ the present improvement. In other words the temperatures and pressures, and relative amount of aluminum and liquid medium comprising triethyl aluminum can generally be about the same as would be employed without the present accelerated hydrogenation operation. On the other hand, the present process permits very effective operation at low pressures, that is, the same production rate at low pressures as heretofore required very high pressure. Typical conditions are, in a batch type operation, a reaction temperature of about 140° C., and aluminum powder in an active state, provided in the proportions of at least one gram atom to one gram mole of alkylated aluminum present in the system. Ordinarily, some supra-atmospheric pressure is quite desirable in order to provide a reasonable degree of contacting. Supra-atmospheric pressures of hydrogen, of up to usually 5,000 pounds per square inch, are desirable. The operating temperatures similarly are subject to appreciable latitude of, for example, from 75 to about 200° C. The reaction chamber is provided with mechanism for vigorous agitation of the reaction components, since in all instances a heterogeneous system is involved. The relative proportions of gas space to the remainder of the reaction zone, are not particularly critical. Ordinarily, it is desirable that the gas space be at least about a quarter, or preferably from a volume equal to, to twice the volume of the remainder of the reaction zone.

The product system obtained from any of the foregoing examples comprises a mobile liquid phase and minor amounts of unreacted aluminum, the proportion being dependent upon the initial quantity charged. The liquid phase can be employed as such for various purposes, representing as it does a soluble readily available aluminum organometallic material. Ordinarily, a typical composition of the product liquid is as follows:

| | Weight percent |
|---|---|
| Diethyl aluminum hydride | 65 |
| Triethyl aluminum | 34 |
| Other, including aluminum ethoxide | 1 |

Very frequently, the ultimate product desired is a substantially pure triethyl aluminum liquid. In such cases, the liquid, or if desired the heterogeneous product mixture including solids not yet reacted, can be treated by pressurizing with a separate stream of ethylene, which results in the addition of ethylene to the aluminum-hydrogen bonding of the diethyl aluminum hydride component of the liquid, thereby forming triethyl aluminum according to the following equation:

$$(C_2H_5)_2AlH + C_2H_4 \rightarrow (C_2H_5)_3Al$$

As heretofore indicated, the present improvement is readily applicable in the direct formation of triethyl aluminum by a single stage process. By this is meant that, instead of treating an initial triethyl aluminum liquid with hydrogen to form a partly hydrided liquid product, the hydrogen treatment may be accompanied by a joint feed of an ethylene component. In such cases, the following reactions are occurring simultaneously:

$$2(C_2H_5)_3Al + \tfrac{3}{2}H_2 + Al \rightarrow 3(C_2H_5)_2AlH$$
$$3(C_2H_5)_2AlH + 3C_2H_4 \rightarrow 3(C_2H_5)_3Al$$

It is seen from the foregoing equation, that if considered occurring concurrently, that ethylene and hydrogen would be fed with the ethylene in the proportions of roughly about 2 moles to 1 mole of hydrogen. In practice it is found that an ethylene:hydrogen mole ratio of from 1.5 to 2.5:1 is quite satisfactory. Investigation of this joint feed type of operation, and comparison of the individual reactions thereof, shows that the first reaction, viz. the treatment of triethyl aluminum, hydrogen and aluminum is much slower than the addition of ethylene to the diethyl aluminum hydride. Hence, the present improvement of accelerating the hydrogenation step is particularly beneficial in providing a balanced process. A typical illustration of such a joint feed operation is shown by the following example.

*Example V*

A reaction vessel is charged with a liquid solid reaction system consisting of a liquid phase and solid aluminum powder, in approximately equal weight proportions. The liquid phase is a commercial grade of triethyl aluminum, containing several percent diethyl aluminum hydride and minor amounts of aluminum ethoxide. Tetraethyl sodium aluminum is introduced in the proportions of about 2 percent by weight of the liquid phase. The system is heated to 140° C. with vigorous agitation. A mixed stream of hydrogen and ethylene gas, in, roughly, proportions of 2 moles of ethylene to one of hydrogen, is fed to the reactor at a total pressure of 500 pounds per square inch gauge. Reaction occurs smoothly and a high yield of triethyl aluminum is provided.

When the foregoing operation is repeated, except that the catalyst is omitted, it is found that a pressure of about 1,000 pounds is required to provide a comparable rate. It is thus seen that, according to the present method, substantial savings in equipment investment are possible, through operating at low pressure with no loss in throughput or production.

From the foregoing description and examples, it will be clear that the benefits of the present process can be attained in a wide variety of conditions. Thus, temperature, pressures of operation, agitation, relative proportions of initially charged materials in batch reactions or during reaction, are susceptible to substantial variation, as discussed more fully below. Generally, the preferred conditions are applicable in both the two stage type of operation (viz., formation of an ethyl aluminum hydride firstly followed by a second stage comprising the ethylation of the aluminum hydrogen bonds thereof) and in the single stage operation (wherein the reaction with hydrogen and the ethylation of aluminum hydrogen bonds with ethylene are carried out concurrently).

With respect to pressure of operation, as already indicated, in the two-stage type of operation, hydrogen pressures in the first stage of slightly above atmospheric to 5,000 pounds per square inch gauge or even higher are eminently suitable. In the single stage operation, wherein mixed or separate streams of hydrogen and ethylene are fed concurrently, the same pressures are applicable, although generally a lower hydrogen partial pressure is quite satisfactory, because the diethyl aluminum hydride formed is substantially immediately converted to triethyl aluminum product. In the first stage of two stage operations, it is found that the higher hydrogen pressures increase ultimate degree of conversion of the triethyl aluminum initially present to diethyl aluminum hydride. As already pointed out, this factor is not of particular consequence in the single stage type of operation wherein triethyl aluminum is the desired material.

As to the temperature of operation, it is also found that lower temperatures appear to expedite the ultimate degree of conversion in the first stage of operation, and in addition appear to benefit the ethylation reaction, although this portion of an overall process to make triethyl aluminum is of no criticality or it is not a limiting factor in the process. The temperatures of operation can be, generally from slightly above ambient temperatures to even as high as above 200° C., although triethyl aluminum decomposes fairly rapidly at 230° C. Hence, a preferred range of temperatures of operation are from 100 to 200° C., and an even more preferred embodiment utilizes temperatures of from 120 to 160° C.

The desired reactions are accompanied by a small amount of undesired side reactions. Vigorous agitation and therefore efficient contacting, relatively short contact time in the reaction zone, moderate temperature ranges and other factors can be utilized to prevent these undesired side reactions. The side reactions, which tend to decrease the yield according to the desired route include the formation of higher alkylated aluminum product materials, such as butyl aluminum compounds, and in addition, it is found that a certain small amount of triethyl aluminum reacts with hydrogen directly to form diethylaluminum hydride and ethane. Of course, diethyl aluminum hydride can be recaptured to form triethyl aluminum by reaction with ethylene, but there is no net gain because ethane is formed and this is not reacted with the components present.

Having fully described the process of the invention, what is claimed is:

I claim:

1. In a process of forming an ethyl aluminum compound by reacting aluminum with hydrogen in the presence of triethyl aluminum, said aluminum being active and susceptible to said treatment, the improvement comprising supplying as a hydrogenation accelerator a catalytic quantity, of from about 0.1 to 25 mole percent on the basis of the triethyl aluminum present, of an organo compound of a reactive metal selected from the group consisting of alkali metals and alkaline earth metals, and said compound consisting of metal, carbon and hydrogen, and carrying out said hydrogen treatment at a supra-atmospheric pressure of up to 5,000 pounds per square inch and at a temperature of from 75 to 200° C.

2. The process of claim 1 further defined in that the organo compound is ethyl sodium.

3. The process of claim 1 further defined in that the organo compound is ethyl lithium.

4. In a process for forming triethyl aluminum comprising reacting with hydrogen, aluminum and triethyl aluminum, said aluminum being active and susceptible to said reaction and forming an ethyl aluminum hydride thereby, and reacting said ethyl aluminum hydride with ethylene, the improvement comprising supplying to the hydrogenation step from about 0.1 to 25 mole percent, on the basis of the triethyl aluminum present, of a bimetallic complex compound of a reactive metal, and aluminum, said reactive metal being selected from the group consisting of the alkali metals and alkaline earth metals and said compound consisting of said metal, aluminum, carbon, and hydrogen, and carrying out the reaction with hydrogen at a supra-atmospheric pressure of up to about 1,000 pounds per square inch and at a temperature of from about 100 to about 200° C.

5. The process of claim 4 further defined in that the complex alkyl is tetraethyl sodium aluminum.

6. In a process for forming triethyl aluminum comprising reacting with ethyene and hydrogen, aluminum and triethyl aluminum, said aluminum being active and susceptible to said reaction, the improvement comprising supplying to said reaction tetraethyl sodium aluminum in the proportions of from about 0.1 to 25 mole percent, based on the triethyl aluminum present, and carrying out said reaction at a supra-atmospheric pressure of up to about 1000 pounds per square inch and at a temperature of from about 100 to 200° C.

7. In a process for manufacturing triethyl aluminum comprising reacting with ethylene and hydrogen, aluminum and triethyl aluminum, said aluminum being active and susceptible to said reaction, the improvement comprising withdrawing a liquid stream from said reaction and contacting said stream with sodium metal, and forming thereby a side product comprising tetraethyl sodium aluminum and aluminum solids, and returning said side reaction product to the principal reaction in proportions to provide from about 0.1 to 25 mole percent of the tetraethyl sodium aluminum on the basis of the aluminum triethyl therein, and carrying out said principal reaction at a supra-atmospheric pressure of up to about 1000 pounds per square inch and at a temperature of from about 100 to 200° C.

References Cited in the file of this patent

UNITED STATES PATENTS

| | | |
|---|---|---|
| 2,787,626 | Redman | Apr. 2, 1957 |
| 2,892,738 | Dobratz | June 30, 1959 |
| 2,921,876 | Dobratz | Jan. 19, 1960 |

FOREIGN PATENTS

| | | |
|---|---|---|
| 770,707 | Great Britain | Mar. 20, 1957 |
| 778,098 | Great Britain | July 3, 1957 |
| E10,906 IVb/120 | Germany | Aug. 30, 1956 |